United States Patent
Cogliati

(10) Patent No.: US 9,939,534 B2
(45) Date of Patent: Apr. 10, 2018

(54) METHODS AND APPARATUSES FOR DETECTION OF RADIATION WITH SEMICONDUCTOR IMAGE SENSORS

(71) Applicant: BATTELLE ENERGY ALLIANCE, LLC, Idaho Falls, ID (US)

(72) Inventor: Joshua Joseph Cogliati, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 667 days.

(21) Appl. No.: 14/080,542

(22) Filed: Nov. 14, 2013

(65) Prior Publication Data

US 2015/0130948 A1   May 14, 2015

(51) Int. Cl.
| | |
|---|---|
| H04N 5/357 | (2011.01) |
| G01T 1/24 | (2006.01) |
| G01T 7/00 | (2006.01) |
| H04N 5/217 | (2011.01) |
| H04N 5/363 | (2011.01) |
| H04N 5/367 | (2011.01) |

(52) U.S. Cl.
CPC ............... *G01T 1/244* (2013.01); *G01T 7/00* (2013.01); *H04N 5/2176* (2013.01); *H04N 5/363* (2013.01); *H04N 5/367* (2013.01)

(58) Field of Classification Search
None
See application file for complete search history.

(56) References Cited

U.S. PATENT DOCUMENTS

| | | | |
|---|---|---|---|
| 6,181,832 B1 * | 1/2001 | Maas, III | G06K 9/03 382/275 |
| 6,408,050 B1 * | 6/2002 | Han | G01T 1/17 378/98.11 |
| 7,391,028 B1 | 6/2008 | Rubenstein | |
| 7,737,410 B2 | 6/2010 | Rubenstein | |
| 7,940,959 B2 | 5/2011 | Rubenstein | |
| 8,155,382 B2 | 4/2012 | Rubenstein | |

(Continued)

OTHER PUBLICATIONS

Li et al., "An Adaptive Algorithm for Gamma Spots Removal in CCD-based Neutron Radiography and Tomography," May 19, 2006, Nuclear Instruments & Methods in Physics Research Section A, Elsevier.*

(Continued)

*Primary Examiner* — Edemio Navas, Jr.
(74) *Attorney, Agent, or Firm* — TraskBritt

(57) ABSTRACT

A semiconductor image sensor is repeatedly exposed to high-energy photons while a visible light obstructer is in place to block visible light from impinging on the sensor to generate a set of images from the exposures. A composite image is generated from the set of images with common noise substantially removed so the composite image includes image information corresponding to radiated pixels that absorbed at least some energy from the high-energy photons. The composite image is processed to determine a set of bright points in the composite image, each bright point being above a first threshold. The set of bright points is processed to identify lines with two or more bright points that include pixels therebetween that are above a second threshold and identify a presence of the high-energy particles responsive to a number of lines.

27 Claims, 9 Drawing Sheets

(56) References Cited

U.S. PATENT DOCUMENTS

| | | | |
|---|---|---|---|
| 8,158,950 B2 | 4/2012 | Rubenstein | |
| 8,324,589 B2 | 12/2012 | Rubenstein | |
| 8,452,049 B2 | 5/2013 | Rubenstein | |
| 2001/0030708 A1* | 10/2001 | Ide | H04N 9/045 348/362 |
| 2008/0018794 A1* | 1/2008 | Fung | H04N 11/046 348/612 |
| 2008/0232662 A1* | 9/2008 | Komiya | A61C 5/08 382/128 |
| 2010/0048242 A1* | 2/2010 | Rhoads | G06F 17/30244 455/556.1 |
| 2010/0098331 A1* | 4/2010 | Meng | G06T 7/0081 382/164 |
| 2013/0051516 A1* | 2/2013 | Yang | A61B 6/03 378/4 |
| 2013/0235236 A1* | 9/2013 | Kobayashi | H04N 5/361 348/243 |
| 2013/0292576 A1* | 11/2013 | Tsai | G01T 7/00 250/370.07 |
| 2013/0329237 A1* | 12/2013 | Li | H04N 1/64 358/1.9 |
| 2013/0343646 A1* | 12/2013 | Hata | G06K 9/4652 382/165 |
| 2014/0092407 A1* | 4/2014 | Sawada | H04N 1/6027 358/1.9 |
| 2014/0110586 A1* | 4/2014 | Fasbender | G01T 1/24 250/361 R |

OTHER PUBLICATIONS

Cogliati, "Determining Camera Gain in Room Temperature Cameras," INL/EXT-10-20072, (Dec. 15, 2010), pp. 1-4.

Drukier et al.; "Low Cost, Pervasive Detection of Radiation Threats;" Image Insight, Inc.; Advanced Fuel Research, Inc.; (2011), pp. 365-371.

Holland, "X-Ray Spectroscopy Using MOS CCDs," Nuclear Instruments and Methods in Physics Research A 337 (1996), pp. 334-339.

https://play.google.com/store/apps/details?id=com.rdklein.radioactivity, Radioactivity Counter, Google play, (accessed Nov. 14, 2013), 2 pages.

Ishiwatari, "New Analysis Method for CCD X-Ray Data," Nuclear Instruments and Methods in Physics Research A 556 (2006), pp. 509-515.

Kim, "Analysis of Noise characteristics for the Active Pixels in CMOS Image Sensors for X-Ray Imaging," Nuclear Instruments and Methods in Physics Research A 565 (2006), pp. 263-267.

Knoll, "Electron Spectroscopy," Radiation Detection and Measurement, Chapter 13, part E, (2000), pp. 474-476.

Li et al., "An Adaptive Algorithm for Gamma Spots Removal in CCD-Based Neutron Radiography and Tomography," Nuclear Instruments and Methods in Physics Research A 564 (2006) 405-413.

MacDonald, "A CCD-Based Tissue Imaging System," Nuclear Instruments and Methods in Physics Research A 392 (1997), pp. 220-226.

Idaho National Laboratory, Fact Sheet titled "CellRad a Cellphone-Based Radiation Warning System," Jan. 2013, 2 pages.

* cited by examiner

METHODS AND APPARATUSES FOR DETECTION OF RADIATION WITH SEMICONDUCTOR IMAGE SENSORS

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

Embodiments of the present disclosure relate to detection of radiation in the form of high-energy particles. More particularly, embodiments of the present disclosure relate to detection of high-energy particles with semiconductor image sensors.

BACKGROUND

Exposure to radiation from radioactive sources can be very dangerous to humans and some radioactive materials can be used in the creation of devastating weapons. It would be very desirable to have means for detection of such radiation in many environments, such as laboratories, nuclear power stations, transportation corridors, airports, train stations, and any area where large groups of people may gather.

Radioactive sources produce ionizing radiation when a single atom decays into another form. This ionizing radiation can come in several forms of high-energy particles including beta particles (which are high-energy electrons), alpha particles (which are helium nuclei) and gamma photons (which are high-energy photons). The beta and alpha particles may be stopped fairly quickly when they travel through material, but gamma photons can travel long distances before being absorbed.

Different isotopes produce different types of ionizing radiation and different energies of the radiation. For example, Cs-137 produces 662 keV photons. As another example, Co-60 produces 1173 and 1332 keV photons.

In contrast, ordinary light in the visible and near-visible ranges is non-ionizing and has much lower energies that are in the eV range. For example, at the low range of visible light photons for red light have about 1.77 eV of energy and at the high range of visible light photons for violet light have about 3.10 eV of energy.

Many portable devices such as digital cameras, cellular telephones, and tablets are becoming near ubiquitous as they become more portable and interconnected. In most cases, these portable devices include semiconductor image sensors for capturing visible light images and can be easily interfaced with a variety of communication networks. While not intended, these semiconductor imagers can absorb energy from high-energy particles that interact with the semiconductor image sensor and produce what appear to be artifacts on the image when capturing a visible light image.

The inventor has appreciated that there is a need for devices that are economical and readily available for detecting and reporting the presence of high-energy particles that indicate a radiation source is in the vicinity of the device.

BRIEF SUMMARY

Embodiments of the present disclosure comprise a portable device with an image capturing capability and include a semiconductor image sensor comprising a plurality of pixels, a visible light obstructer, and processing circuitry. The visible light obstructer is for substantially blocking visible light from impinging on the semiconductor image sensor when in place. The processing circuitry is configured for causing the semiconductor image sensor to be exposed to the high-energy particles during a period of interest and while the visible light obstructer is in place. The processing circuitry is also configured for repeatedly sampling the semiconductor image sensor during the period of interest to generate a plurality of images and determining a common noise in the plurality of images. The processing circuitry is also configured for generating a composite image from the plurality of images with the common noise substantially removed so the composite image includes image information corresponding to one or more radiated pixels of the plurality of pixels that absorbed at least some energy from one or more of the high-energy particles.

Embodiments of the present disclosure include a method of detecting high-energy particles on a portable device. The method includes exposing a semiconductor image sensor to high-energy particles during a period of interest and while a visible light obstructer is in place to substantially block visible light from impinging on the semiconductor image sensor. The semiconductor image sensor is repeatedly sampled during the period of interest to generate a plurality of images and a common noise is determined in the plurality of images. A composite image is generated from the plurality of images with the common noise substantially removed so the composite image includes image information corresponding to one or more radiated pixels of a plurality of pixels that absorbed at least some energy from one or more of the high-energy particles.

Other embodiments of the present disclosure comprise a computing system including memory for holding computing instructions and at least one processor operably coupled to the memory and configured to execute the computing instructions. The computing instructions cause the computing system to process an image from a semiconductor image sensor exposed to high-energy particles while not exposed to visible light to determine a set of bright points in the image, each bright point being above a first threshold. Executing the computing instructions also cause the computing system to process the set of bright points to identify lines comprising two or more bright points that include pixels therebetween that are above a second threshold. Executing the computing instructions also cause the computing system to identifying a presence of the high-energy particles responsive to a number of lines.

Still other embodiments of the present disclosure include a method of detecting high-energy particles. The method includes processing an image from a semiconductor image sensor exposed to high-energy particles while not exposed to visible light to determine a set of bright points in the image, each bright point being above a first threshold. The set of bright points is processed to identify lines comprising two or more bright points that include pixels therebetween that are above a second threshold. A presence of the high-energy particles is identified responsive to a number of lines.

Further embodiments of the present disclosure comprise a computing system with an image capturing capability including a portable device and processing circuitry. The portable device includes a semiconductor image sensor comprising a plurality of pixels and a visible light obstructer for substantially blocking visible light from impinging on the semiconductor image sensor when in place. The processing circuitry is configured for causing the semiconductor image sensor to be exposed to high-energy particles during a period of interest and while the visible light obstructer is in place. The processing circuitry is also configured for repeatedly sampling the semiconductor image sensor during the period of interest to generate a plurality of images. The processing circuitry is also configured for generating a composite image from the plurality of images with a common noise substantially removed so the composite image includes image information corresponding to one or more radiated pixels of the plurality of pixels that absorbed at least some energy from one or more of the high-energy particles. The processing circuitry is also configured for processing the composite image to determine a set of bright points in the composite image, each bright point being above a first threshold. The processing circuitry is also configured for processing the set of bright points to identify lines comprising two or more bright points that include pixels therebetween that are above a second threshold and identifying a presence of the high-energy particles responsive to a number of lines.

Still further embodiments of the present disclosure include a method of detecting high-energy particles. The method includes exposing a semiconductor image sensor to high-energy particles during a period of interest and while a visible light obstructer is in place to substantially block visible light from impinging on the semiconductor image sensor. The method also includes repeatedly sampling the semiconductor image sensor during the period of interest to generate a plurality of images. A composite image is generated from the plurality of images with a common noise substantially removed so the composite image includes image information corresponding to one or more radiated pixels of a plurality of pixels that absorbed at least some energy from one or more of the high-energy particles. The composite image is processed to determine a set of bright points in the composite image, each bright point being above a first threshold. The set of bright points is processed to identify lines comprising two or more bright points that include pixels therebetween that are above a second threshold and identify a presence of the high-energy particles responsive to a number of lines.

DETAILED DESCRIPTION

Figure 1A:
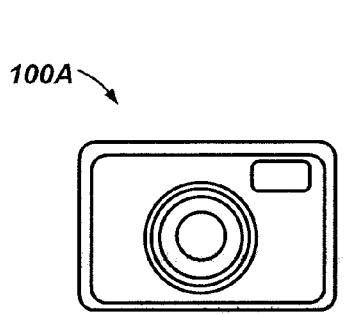
FIGS. 1A and 1B illustrate examples of portable devices for use in one or more embodiments of the present disclosure.

In the following description, reference is made to the accompanying drawings in which is shown, by way of illustration, specific embodiments in which the disclosure may be practiced. The embodiments are intended to describe aspects of the disclosure in sufficient detail to enable those skilled in the art to practice the invention. Other embodiments may be utilized and changes may be made to the disclosed embodiments without departing from the scope of the disclosure. The following detailed description is not to be taken in a limiting sense, and the scope of the present invention is defined only by the appended claims.

Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions.

In the following description, elements, circuits, modules, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus for carrying the signals, wherein the bus may have a variety of bit widths.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor is configured to execute instructions (e.g., software code) related to embodiments of the present disclosure. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of one or more modules for performing a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a module, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both non-volatile computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the present disclosure include apparatuses and methods for using semiconductor image sensors in portable devices to detect and analyze images for the presence of high-energy particles.

Figure 1B:
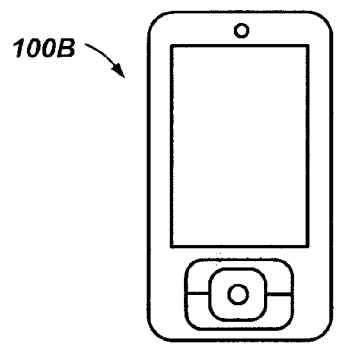

FIGS. 1A and 1B illustrate examples of portable devices 100 for use in one or more embodiments of the present disclosure. As non-limiting examples, a camera 100A and a cellphone 100B are shown as portable devices that may be used in some embodiments of the present disclosure. Many other types of portable devices, such as, for example, personal digital assistants, tablets, laptop computers and wearable devices may also be used as long as they include a semiconductor image sensor and processing circuitry that can be programmed to perform at least some of the processes described herein.

Figure 1C:
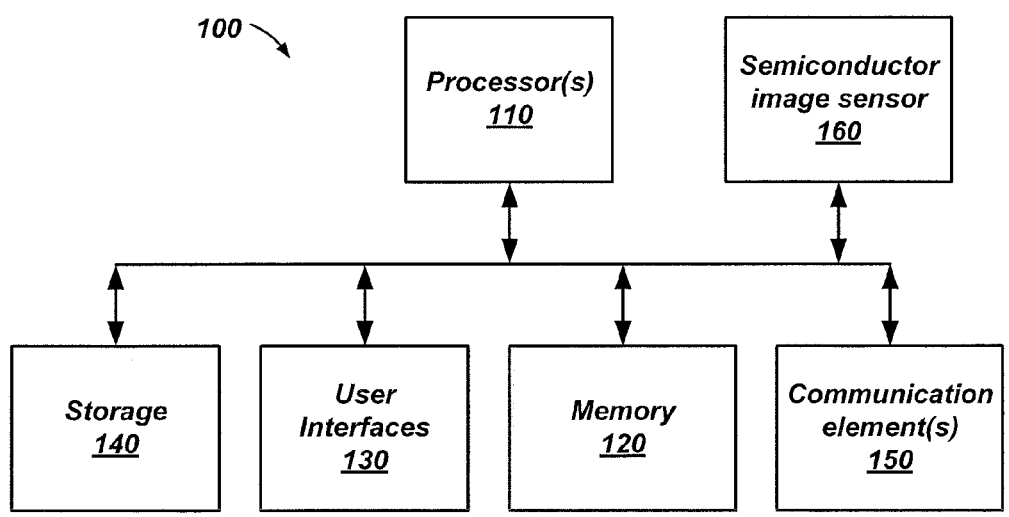
FIG. 1C is a simplified block diagram of some elements of portable devices for use in one or more embodiments of the present disclosure.

FIG. 1C is a simplified block diagram of some elements of computing systems for use in one or more embodiments of the present disclosure. The computing system 100 may be a user-type computer, a file server, a compute server, notebook computer, tablet, handheld device, mobile device, or other similar computer system for executing software. Computer, computing system, portable device, mobile device, and server may be used interchangeably herein to indicate a system for practicing portions or all of embodiments of the present disclosure. The computing system 100 is configured for executing software programs containing computing instructions and may include one or more processors 110, memory 120, one or more user interface elements 130 (may also be referred to herein simply as a user interface 130), one or more communication elements 150, storage 140, and a semiconductor image sensor 160.

The one or more processors 110 may be configured for executing a wide variety of operating systems and applications including the computing instructions for carrying out embodiments of the present disclosure.

The memory 120 may be used to hold computing instructions, data, and other information for performing a wide variety of tasks including performing embodiments of the present disclosure. By way of example, and not limitation, the memory 120 may include Synchronous Random Access Memory (SRAM), Dynamic RAM (DRAM), Read-Only Memory (ROM), Flash memory, and the like.

The processor 110 may also be referred to herein as processing circuitry. As a non-limiting example, when implemented as custom circuitry, the processing circuitry can be configured for carrying out embodiments of the present disclosure. As another non-limiting example, the processing circuitry may include the memory 120 for holding computing instructions and the one or more processors 110 for executing the computing instructions.

As non-limiting examples, the user interface elements 130 may include elements such as displays, keyboards, mice, joysticks, haptic devices, microphones, speakers, cameras, and touchscreens.

The communication elements 150 may be configured for communicating with other devices or communication networks. As non-limiting examples, the communication elements 150 may include elements for communicating on wired and wireless communication media, such as, for example, serial ports, parallel ports, Ethernet connections, universal serial bus (USB) connections, IEEE 1394 ("firewire") connections, THUNDERBOLT™ connections, BLUETOOTH® wireless connections, 802.11 type wireless connections, cellular telephone/data networks, and other suitable communication interfaces and protocols.

The storage 140 may be used for storing relatively large amounts of non-volatile information for use in the computing system 100 and may be configured as one or more storage devices. By way of example, and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

FIG. 1C is intended for discussing a simplified version of a computing system 100. A person of ordinary skill in the art will recognize that the computing system 100 may be configured in many different ways with different types of interconnecting busses between the various elements. Moreover, the various elements may be subdivided physically, functionally, or a combination thereof. As one non-limiting example, the memory 120 may be divided into cache memory, graphics memory and main memory. Each of these memories may communicate directly or indirectly with the one or more processors 110 on separate busses, partially-combined busses, or a common bus.

Software processes described herein are intended to illustrate representative processes that may be performed by the systems described herein. Unless specified otherwise, the order in which the process acts are described is not intended to be construed as a limitation, and acts that may be described as occurring sequentially for ease of description may occur in a different sequence, occur concurrently, occur concurrently on multiple hardware platforms, or occur in one or more parallel process streams. It will be appreciated by those of ordinary skill in the art that many acts and processes may occur in addition to those outlined in flow charts. Furthermore, the processes may be implemented in any suitable hardware, software, firmware, or combinations thereof. When executed as firmware or software, the instructions for performing the processes may be stored on a computer-readable medium and hardware executing the processes should be considered as special purpose hardware configured for carrying out processes described herein.

By way of non-limiting example, computing instructions for performing the processes may be stored on the storage 140, transferred to the memory 120 for execution, and executed by the processors 110. The processors 110, when executing computing instructions configured for performing the processes, constitute structure for performing the processes and can be considered a special-purpose computer when so configured. In addition, some or all portions of the processes may be performed by hardware specifically configured for carrying out the processes.

The semiconductor image sensor 160 may be a sensor such as, for example, a Charge Coupled Device (CCD) semiconductor image sensor or a Complementary Metal Oxide Semiconductor (CMOS) image sensor generally configured to interact with visible light.

Some of the elements may not be present in some computing systems used in embodiments of the present disclosure. For example, a remote computing device as described below in connection with FIG. 2 need not include a semiconductor image sensor 160 or a user interface as it may be configured in a server type arrangement where any user interface may occur through the communication elements 150.

Figure 2:
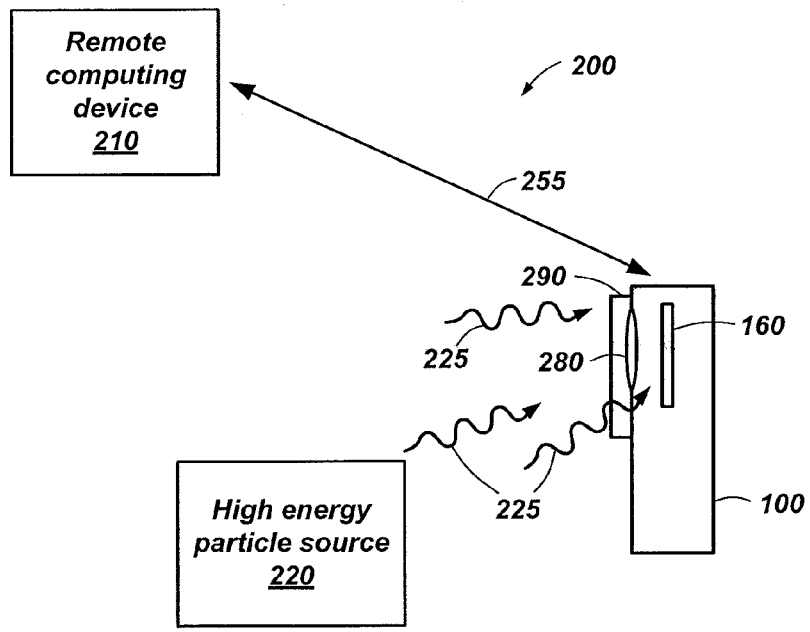
FIG. 2 illustrates a system for detecting high-energy particles from a high-energy particle source with a portable device, processing images obtained by the portable device, and sending the processed images to a remote computing device for additional processing.

FIG. 2 illustrates a system 200 for detecting high-energy particles 225 from a high-energy particle source 220 using a portable device 100, processing images obtained by the portable device 100, and sending preliminarily processed images 255 (also referred to herein as a composite image 255) to a remote computing device 210 for additional processing.

An aperture 280 may be present for allowing visible light to enter the portable device 100 and impinge on the semiconductor image sensor 160. In embodiments of the present disclosure, visible light effects on the semiconductor image sensor 160 may make it more difficult to recognize the effects from high-energy particles 225. As a result, embodiments of the present disclosure may include a visible light obstructer 290 for substantially blocking visible light from entering through the aperture 280 and impinging on the semiconductor image sensor 160. Therefore, when the visible light obstructer 290 is in place, images captured by the semiconductor image sensor 160 are substantially due to exposure to high-energy particles 225 and other effects, such as, for example, thermal noise and defective pixels. Unlike visible light, high-energy particles 225 may affect the semiconductor image sensor 160 when they impinge on the semiconductor image sensor 160 from almost any direction. As non-limiting examples, the high-energy particles 225 may enter from the back of the semiconductor image sensor 160, through the case of the portable device 100, and through the visible light obstructer 290. However, more energy from the high-energy particles 225 may be absorbed by the semiconductor image sensor 160 when they arrive at certain angles. As a result, in some embodiments, it may be best to orient the portable device 100 such that the semiconductor image sensor 160 is relatively perpendicular to the direction from which the high-energy particles 225 are likely to be emanating.

Radioactive sources produce ionizing radiation when a single atom decays into another form. This ionizing radiation can come in several forms of high-energy particles 225 including beta particles (which are high-energy electrons), alpha particles (which are helium nuclei) and gamma photons (which are high-energy photons). The beta and alpha particles may be stopped fairly quickly when they travel through material, but gamma photons can travel long distances before being absorbed.

Different isotopes produce different types of ionizing radiation and different energies of the radiation. For example, Cs-137 produces 662 keV photons. As another example, Co-60 produces 1173 and 1332 keV photons.

Visible light is generally non-ionizing and has much lower energies that are in the eV range, for example, the photons for red have about 1.77 eV of energy, which goes up to about 3.10 eV for violet light photons.

Photons can interact with a semiconductor image sensor 160 in a variety of ways. Two examples of interaction are a photoelectric effect and Compton scattering. The photoelectric effect may dominate at lower energies. For example, almost all visible light photons that a semiconductor image sensor 160 absorbs will be absorbed by the photoelectric effect. In the photoelectric effect, the incoming photon's energy is almost completely absorbed, and the energy is transferred to an electron in the semiconductor material that is ionized (that is, stripped off of an atom).

Compton scattering is dominate at intermediate energies around 1 MeV. In Compton scattering, the incoming photon transfers some of its energy to an electron that it ionizes when the incoming photon interacts with the semiconductor material of the semiconductor image sensor 160. This interaction results in the ionized electron having only part of the energy of the photon, so the energy that is absorbed, may vary.

The relation between the angle of the electron, the energy of the electron and the energy of the incoming photon in Compton scattering can be expressed as equation 1:

$$\frac{KE_e(E_\gamma + m_e c^2)}{E_\gamma \sqrt{KE_e(2m_e c^2 + KE_e)}} = \cos\phi_e$$

where:
$KE_e$ is the energy of the electron,
$E_\gamma$ is the energy of the photon,
$\phi_e$ is the angle the electron scatters, and
$2m_e c^2$ is approximately 511 keV.

Figure 3:
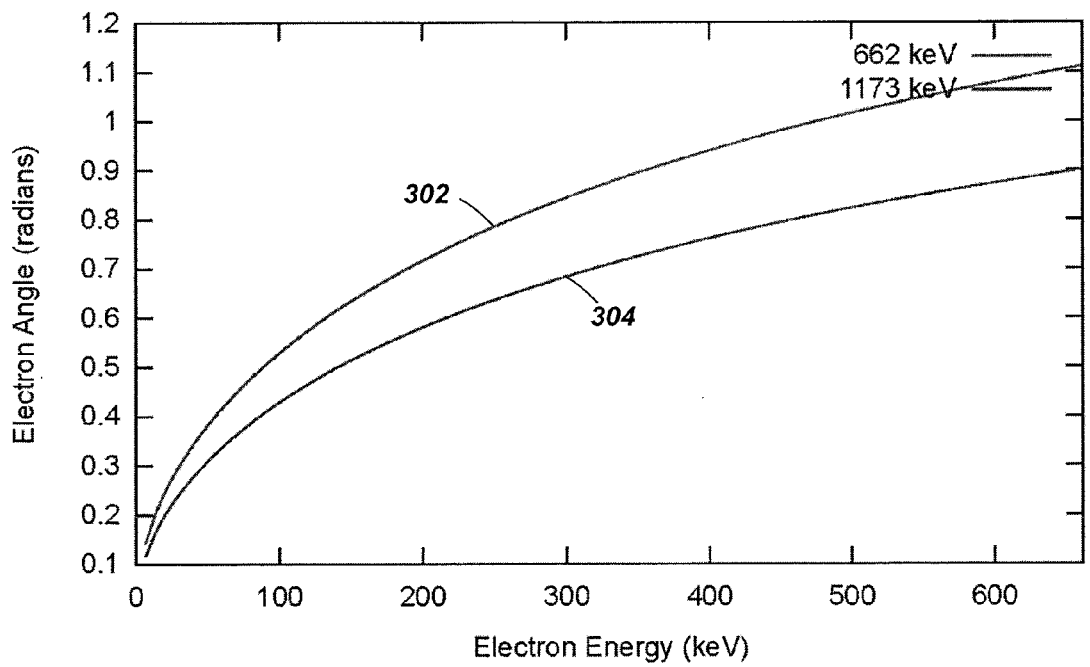
FIG. 3 shows two different distributions of angle to energy relationship for Compton scattering.

FIG. 3 shows two different distributions of angle to electron energy relationship for Compton scattering. Line 302 shows the angle the electron scatters relative to the electron energy when the energy of the incoming photon is about 662 keV. Line 304 shows the angle the electron scatters relative to the electron energy when the energy of the incoming photon is about 1173 keV.

With Compton scattering, the ionized electrons may have energy that is much higher than the energy required to ionize a single electron. In that case, the high-energy ionized electrons will ionize secondary electrons, which will continue until the energy has been lowered significantly. As a non-limiting example, a 20 keV electron might ionize 10,000 secondary electrons. High enough energy electrons will leave trails of ionization as they travel through the semiconductor image sensor. The higher the energy of the electron, the less energy that the electron will typically leave behind in a given distance (which is related to stopping power).

Charge Coupled Device (CCD) semiconductor image sensors and Complementary Metal Oxide Semiconductor (CMOS) image sensors interact with visible light by using the photoelectric effect. Photons with energies between 1.1 eV to 3.1 eV generally ionize one electron creating a single electron-hole pair. This electron is then captured in a doped region of a photodiode or capacitor. After the collection time has passed, the total number of electrons for each pixel is measured and this is used to determine the brightness for that particular pixel. For CCD image sensors, the electrons are transferred to a common amplifier and analog to digital converter. For CMOS cameras, every pixel has at least one active transistor, which may allow for part of the amplification and measurement to occur at each pixel as it is being read.

For creating colored images, the pixels include different filters disposed in front of the light capturing region of the pixel to filter out most wavelengths of visible light except within a desired region for a specific color. For example, odd rows of pixels might include filters to produce a repeating pattern of pixels for light of Red (R), Green (G), R, G, etc. Even rows of pixels might include filters to produce a repeating pattern of pixels for light of G, Blue (B), G, B, etc. These individual pixels with the specifically filtered colors may be combined together to create the full image that can represent virtually any color.

Note that the full image that is returned usually interpolates the colors to determine individual full color pixels that include data from multiple single color physical pixels (so the first pixel would get most of its red data from the physical R, but the G and B would be interpolated from the nearby physical pixels). For detecting radiation, the color processing makes determining actual energy deposited on the physical pixels more difficult. For radiation detection, the camera is covered so there is substantially no signal from visible light and the color filters do not generally affect the energy impinging on the physical pixels from high-energy particles.

Figure 4A:
FIG. 4A is an example image obtained from a semiconductor image sensor exposed to high-energy particles.

FIG. 4A is an example image 400A obtained from a semiconductor image sensor exposed to high-energy particles. Referring to FIGS. 2 and 4A, the image 400A as obtained by exposing the semiconductor image sensor 160 to high-energy particles while the visible light obstructer 290 substantially prevents exposing the semiconductor image sensor 160 to visible light.

Figure 4B:
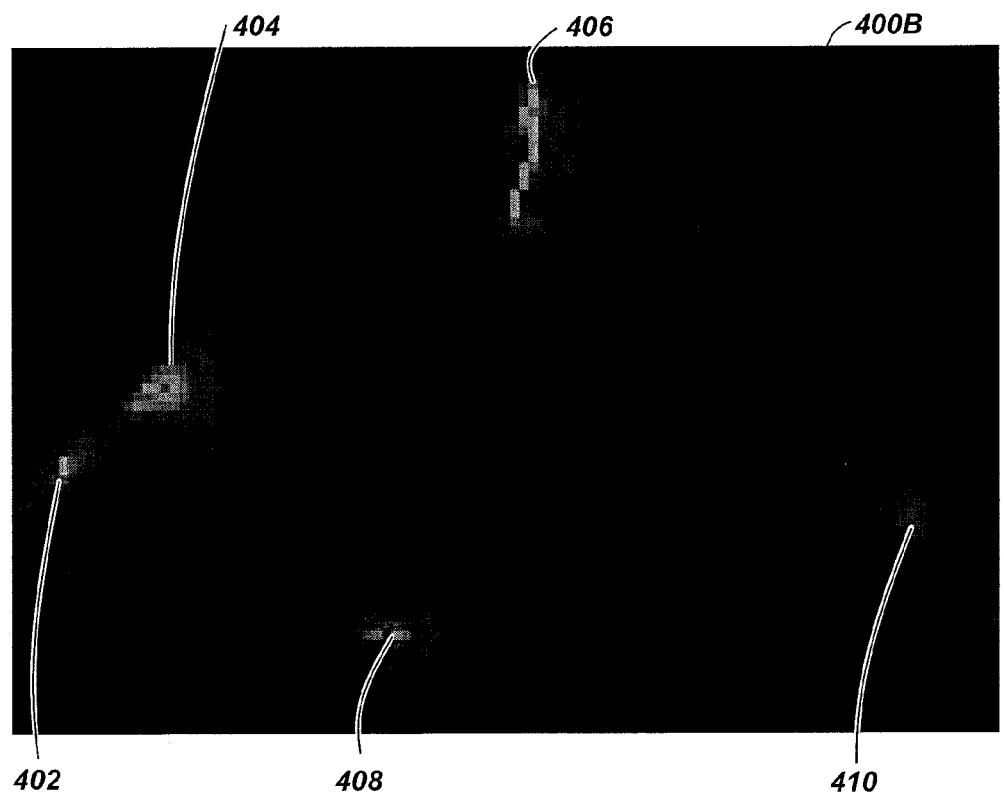
FIG. 4B is a close-up view of the image of FIG. 4A showing individual pixels excited by one or more high-energy particles.

FIG. 4B is a close-up view 400B of the image of FIG. 4A showing individual pixels excited by one or more high-energy particles. Regions 408 and 410 show just a few pixels that have absorbed energy from one or more high-energy particles. Regions 402, 404, and 406 show much larger groupings of pixels that have absorbed energy from one or more high-energy particles. More details about these regions 402, 404, 406, 408, and 410 are discussed below in combination with the description of FIG. 6.

The visible light obstructer 290 has substantially blocked photons of visible light from impinging on the semiconductor image sensor 160. However, besides photons causing ionized electrons, electrons can also be produced by leaky circuits and by heat. These secondary effects result in a signal even when there is no light. However, these effects tend to be similar from image to image with the same sensor.

In embodiments of the present disclosure, several different preliminary image processing techniques may be used to eliminate or minimize the non-signal from the images. These methods generally involve working with multiple images to process each color component (red, green, blue) of each pixel individually. These methods deal with two effects, one is thermal noise, which increases as the temperature increases, and the other is pixels that are defective. The defective pixels (i.e., "bad pixels") generally manifest as bright points, and some of them only light up periodically, so only looking at two pictures can result in incorrectly categorizing the bad pixel as an actual signal. However, if a larger number of exposures are used, it is more likely that the defective pixels will be accurately detected and compensated for in a composite image made from many images.

The simplest method to minimize the effect of defective pixels is to take the median value of the image, and then subtract that from all the images. This process, however, may leave noise since some of the noise will be above the median value.

The next three methods use more complex statistical analysis to try and distinguish the signal relative to the noise. Some of the bad pixels do not have constant values, so they can't simply be subtracted off. One method is to calculate the standard deviation and the mean, and then determine a background image as the highest value that is less than $\bar{x}+2\sigma$, which can be defined as equation 2:

$$\text{background} = \max\{y \epsilon x | y < \bar{x}+2\sigma_x\}$$

where:

x is the set of pixels at a specific location and specific component (e.g., the red component of pixels at 6, 3 in all the images), $\bar{x}$ is the mean of the set of pixels, and $2\sigma_x$ is the standard deviation of the set of pixels.

Another method is to calculate a signal image by using the kurtosis, which determines "peakedness" of a distribution. The kurtosis is the fourth moment as defined by equation 3:

$$\frac{E[(x-E[x])^4]}{E[(x-E[x])^2]^2} - 3$$

When the kurtosis is high, it is quite likely that the image contains ionized signal. With the kurtosis case, the signal is defined as 0 when the kurtosis is below a threshold and the next highest value otherwise.

The last method to find signal is referred to as high-delta and it takes each pixel in all the images and calculates the max value seen, and the second highest value seen, and takes the difference between the two values. This high-delta method reduces both thermal noise and noise from bad pixels that are periodically lit up. Depending on the embodiment, this preliminary signal processing of images can be done on the portable device 100 or the remote computing device 210.

Relative to the remote computing device 210, the portable device 100 usually has much more restrictive processing power. In addition, computations performed on the portable device 100 use substantial battery power. The processors on the portable device 100 are generally slower and less powerful than desktop processors and server processors, and there is usually less memory available on the portable device 100. However, transmitting many pictures to the remote computing device 210 for processing may require excessive bandwidth, which can also use substantial battery power on the portable device 100.

As a result, some embodiments perform some preliminary processing on the portable device 100 such that a composite image derived from multiple images may be sent rather than sending all of the individual images. In such embodiments, a general process for the portable device 100 would be to filter out various noise sources, and determine an approximate dose from the high-energy particles.

Figure 5:
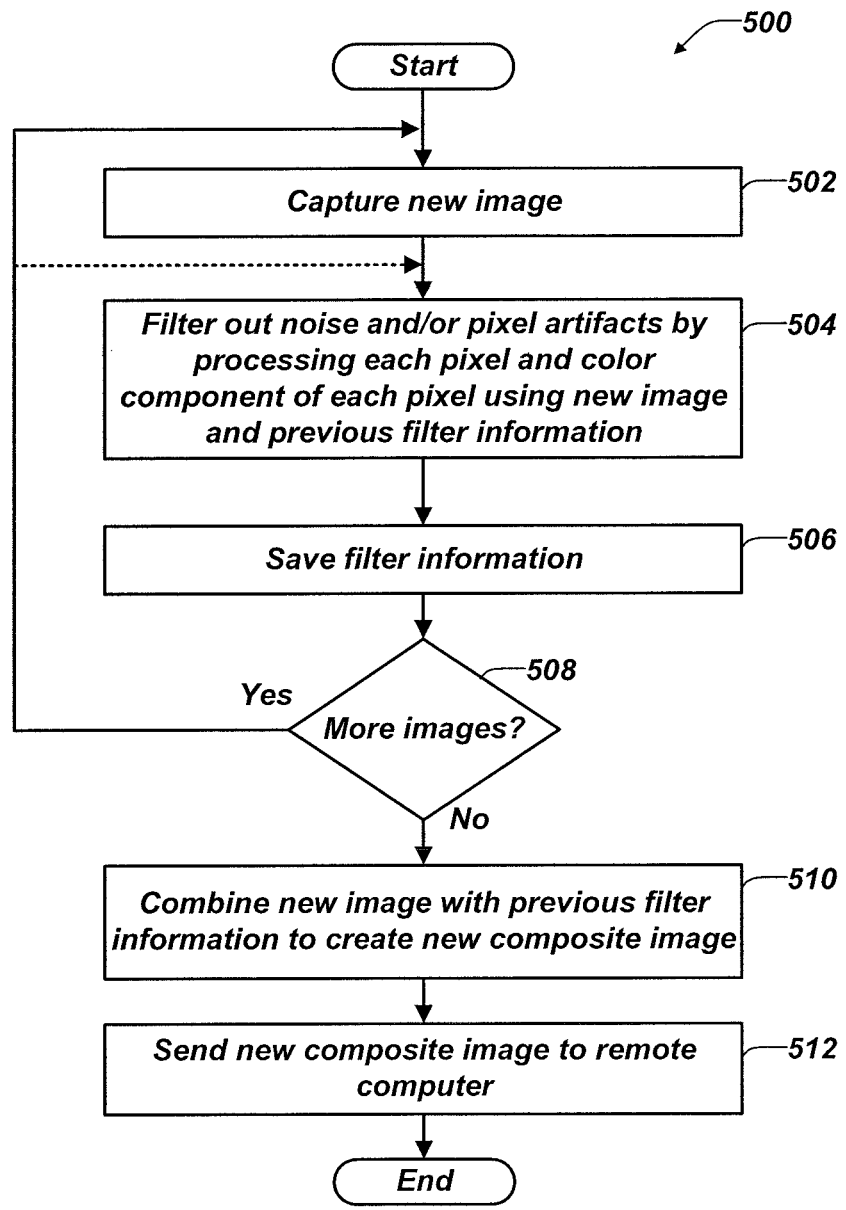
FIG. 5 is a flow diagram showing a process that may be performed on the portable device to capture and process images using the semiconductor image sensor on the portable device.

FIG. 5 is a flow diagram showing a process 500 that may be performed on the portable device 100 to capture and process images using the semiconductor image sensor 160 on the portable device 100 while it is exposed to high-energy particles. Process 500 captures and filters a set of images to generate a composite image representative of the set and with noise and pixel artifacts substantially removed. At operation 502, a new image is captured by the semiconductor image sensor 160.

Operation 504 indicates that noise, pixel artifacts such as bad pixels, or a combination thereof is filtered out of the captured image by processing each pixel and color component of each pixel using the new image and previous filter information. As non-limiting examples, the previous filter information may be one or more previous images that were captured or it may be a running composite image representing filtering of all the previously captured images for this set of images. Operation 506 indicates that the results of the filter process may be saved to be used for processing of subsequent images.

Operation 508 tests to see if more images should be processed for this set of images used to generate the composite image. As non-limiting examples, a range of about 20 to 100 images may be used depending on various parameters such as sensitivity of the semiconductor image sensor 160, the particular portable device 100 being used, and expected density of high-energy particles. If more images are to be processed, control returns to operation 502 to capture and process more images. As an alternative, all of the images making up the set may be captured first before processing. In such a case, control would return to operation 504 to process the next image in the captured set.

Operation block 510 indicates that the new image is combined with the saved filter information from one or more of the previously capture images to create a current representation of the composite image. In some embodiments, such as, for example, the high-delta example discussed below, the combining operation may be performed in combination with the filtering operation of block 504 as each new image is processed. In such cases, where the composite image is updated as each new image is processed, there would be no need to perform the combining process of operation 510 after the final image in the set.

Operation 512 indicates that the resulting composite image representing the set of captured images may be sent to a remote computing device 210 for viewing, other uses, or additional processing. Of course, process 500 may be run multiple times and the composite images from the multiple sets of images may be stored in the portable device 100 to be sent at some later time. In addition, some portable devices 100 may include multiple semiconductor image sensors 160 and process 500 may be performed on separate sets of images captured by each of the semiconductor image sensors 160.

As a more detailed, non-limiting example, process 500 may be performed by a version of the high-delta method. In this high-delta method, the filtering processes each color component of each pixel, and keeps track of the highest value and the next highest value, and defines the difference between these values as the signal.

The algorithm starts by creating two arrays for storing the maximum value seen (max) and the second highest value (max_1) for the colors of each pixel. These arrays are used to determine the delta between the two arrays at each pixel and color component. For each additional picture the arrays are updated. The algorithm checks to see if the current value is greater than what has been seen at that pixel and color component, and if so calculates the signal and updates the arrays. The dose rate is calculated by using a multiplier for the number of pixels that are over a signal threshold value.

Below is pseudocode for updating the max and max_1 arrays from each image and calculating an overSignalThreshold variable and a resulting pictureDose variable:

```
(if first picture:)
    byte[width,height,pixel_components] max[:,:,:] = 0
    byte[width,height,pixel_components] max_1[:,:,:] = 0
overSignalThreshold = 0
maxSignal = 0
for x in image_width:
    for y in image_height:
        for c in pixel_components:
            value = image[x,y,c]
            max_1 = max_1_image[x,y,c]
            max = max_image[x,y,c]
            if value > max_1:
                max_1 = value
                if max_1 > max:
                    swap(max_1,max)
                signal = value - max_1
                maxSignal = max(signal,maxSignal)
                if signal > signalThreshold:
                    overSignalThreshold += 1
                max_1_image[x,y,c] = max_1
                max_image[x,y,c] = max
pictureDose = ovstToDoseMult*overSignalThreshold
```

Every so often (e.g., twenty images and forty images may be used in some examples discussed herein) a combined image is generated. The combined image has much less noise than each individual image. The combinedDose variable will be more accurate than the pictureDose variable calculated on each individual picture for at least two reasons. First, the algorithm combines data from multiple pictures, which will decrease statistical variance of the actual dose because it is mostly the sum of independent counts. Secondly, the high-delta formula is operating over the full number of combined pictures, instead of only having partial data when the algorithm has zeroed the max_1 array. In the combining portion of the algorithm, the max array is reinitialized from the max_1 array. The max array is reset because it contains the signal data, which, if it was never reset, would gradually fill with the highest pixel component value seen. Conversely, if both max and max_1 arrays were zeroed then the information about current noise levels would need to be rediscovered (which would distort the pictureDose variable until enough pictures had been taken).

Pseudocode is shown below for creating a picture (combined image) from max and max_1 data and updating the CombinedDose variable:

```
overSignalThreshold = 0
maxSignal = 0
for x in image_width:
    for y in image_height:
        for c in pixel_components:
            signal = max[x,y,c] - max_1[x,y,c]
            combined_image[x,y,c] = signal
            maxSignal = max(signal,maxSignal)
            if signal > signalThreshold:
                overSignalThreshold += 1
combinedDose =
ovstToDoseMult*overSignalThreshold/numCombinedPictures
max[:,:,:] = max_1[:,:,:]
max_1[:,:,:] = 0
```

In completed experiments, three different cellphone models were used as the portable device 100 and placed in gamma fields produced by Co-60 or Cs-137 sources. The camera on the portable device 100 was facing the source and the lens was covered with electrical tape as the visible light obstructer 290. Forty pictures were recorded for each different dose and nuclide test. The data was then processed using software on the portable device 100 to do the processing according to the high-delta algorithm discussed above.

Threshold values and over-threshold-to-dose-multiple (ovstToDoseMult) values were chosen to minimize false signal and give correct dose results with a 100 mrem/hr Cs-137 field and are given in Table 1. Results from individual cellphones are given in Tables 2, 3 and 4. From these tables the accuracy of the dose calculated can be compared to the actual dose.

TABLE 1 portable device 100 filter settings

| Phone | Signal | Threshold | ovstToDoseMult |
|---|---|---|---|
| Nexus S | 60 | 110 | 0.141 |
| Nexus Galaxy | 60 | 110 | 2.33 |
| Nexus 4 | 32 | 32 | 1.129 |

TABLE 2

Nexus S Calculated Data in mrem/hr

| Actual Dose | nuclide | Pictures | Average Dose | StdDev | Min | Max |
|---|---|---|---|---|---|---|
| 0 | NA | 39 | 0.00 | 0.00 | 0.00 | 0.00 |
| 1 | cs-137 | 41 | 0.59 | 1.89 | 0.00 | 9.58 |
| 10 | cs-137 | 40 | 10.91 | 15.26 | 0.00 | 71.50 |
| 100 | co-60 | 40 | 65.65 | 35.40 | 18.88 | 165.45 |
| 100 | cs-137 | 40 | 100.74 | 34.98 | 41.04 | 178.18 |
| 1000 | co-60 | 40 | 1048.65 | 125.70 | 816.53 | 1324.04 |
| 1000 | cs-137 | 41 | 1043.84 | 120.14 | 734.02 | 1316.74 |
| 10000 | co-60 | 40 | 9482.18 | 670.36 | 8291.71 | 10729.29 |
| 10000 | cs-137 | 40 | 9944.66 | 807.68 | 8333.61 | 11552.83 |
| 100000 | co-60 | 40 | 58918.20 | 25080.20 | 0.00 | 126870.18 |
| 100000 | cs-137 | 40 | 54614.10 | 16064.60 | 30871.41 | 94148.34 |

For the Nexus S, the average dose rate is within 10% for most of the higher dose rates. For the 100,000 mrem/hr dose rate, the high-delta algorithm began saturating, because approximately 4% of the pixels in the image included signal, so in a sequence of images, the max and even the max_1 arrays began to fill with actual gamma signal. This saturation decreased the calculated dose since only in the regions where there is no overlap between previous signal and new signal can the signal be picked up. The Nexus Galaxy and Nexus 4 did not have this saturation issue in the dose rate ranges, most likely because they were less sensitive to high-energy particles. Conversely, they have problems detecting any dose for the lower dose ranges and many of the pictures find zero signal.

TABLE 3

Nexus Galaxy On Phone Calculated Data in mrem/hr

| Actual Dose | nuclide | Pictures | Average Dose | StdDev | Min | Max |
|---|---|---|---|---|---|---|
| 0 | NA | 40 | 0.29 | 1.84 | 0.00 | 11.65 |
| 1 | cs-137 | 40 | 0.00 | 0.00 | 0.00 | 0.00 |
| 10 | cs-137 | 40 | 12.64 | 38.69 | 0.00 | 186.40 |
| 100 | co-60 | 40 | 66.46 | 127.50 | 0.00 | 507.94 |
| 100 | cs-137 | 40 | 98.03 | 160.38 | 0.00 | 582.50 |
| 1000 | co-60 | 40 | 641.45 | 396.17 | 100.19 | 1908.27 |
| 1000 | cs-137 | 40 | 771.00 | 398.74 | 0.00 | 1812.74 |
| 10000 | co-60 | 40 | 6616.27 | 1405.21 | 3341.22 | 9648.53 |
| 10000 | cs-137 | 40 | 7276.30 | 1394.52 | 4678.64 | 10478.01 |
| 100000 | co-60 | 40 | 63945.60 | 6016.57 | 54899.46 | 82696.36 |
| 100000 | cs-137 | 40 | 68712.50 | 4693.94 | 60326.03 | 79508.92 |

TABLE 4

Nexus 4 On Phone Calculated Data in mrem/hr

| Actual Dose | nuclide | Pictures | Average Dose | StdDev | Min | Max |
|---|---|---|---|---|---|---|
| 0 | NA | 39 | 0.00 | 0.00 | 0.00 | 0.00 |
| 1 | cs-137 | 40 | 1.98 | 12.50 | 0.00 | 79.03 |
| 10 | cs-137 | 40 | 9.94 | 32.80 | 0.00 | 162.58 |
| 100 | co-60 | 39 | 77.61 | 100.99 | 0.00 | 410.96 |
| 100 | cs-137 | 37 | 105.33 | 93.72 | 0.00 | 343.22 |
| 1000 | co-60 | 39 | 807.21 | 315.44 | 189.67 | 1756.72 |
| 1000 | cs-137 | 39 | 1128.74 | 339.84 | 461.76 | 1801.88 |
| 10000 | co-60 | 39 | 8219.99 | 869.95 | 6833.84 | 10778.56 |
| 10000 | cs-137 | 39 | 10609.10 | 1139.78 | 8512.66 | 14048.15 |
| 100000 | co-60 | 39 | 83476.70 | 6870.55 | 72193.90 | 97361.57 |
| 100000 | cs-137 | 39 | 102907.00 | 8178.31 | 84725.80 | 118119.36 |

Table 5 lists the time it takes to drain the battery from full to 9%. At about a 9% battery level picture taking may be stopped by the portable device 100. Pictures were taken over a period of interest with intervals of every 60 seconds, every 20 seconds or every 10 seconds. For both tests, composite images were created and sent for every 40 pictures.

TABLE 5

Time to drain battery from full to 9%

| Phone | 60 second interval | 20 second interval | 10 second interval |
|---|---|---|---|
| Nexus S | 439 minutes | 300 minutes | 209 minutes |
| Nexus Galaxy | 1070 minutes | 471 minutes | 399 minutes |
| Nexus 4 | 2520 minutes | 609 minutes | 556 minutes |

In summary, and using a cellphone as an example portable device 100, a CMOS image sensor 160 in a cellphone is sensitive to ionized electrons. Gamma rays penetrate into the cellphone and produce ionized electrons that are then detected by the camera. Thermal noise and other noise are substantially removed on the cellphone, which uses an algorithm that has relatively low memory and computational requirements. As a non-limiting example, the continuous high-delta algorithm is described in detail. Only a small fraction of the energy from high-energy particles is deposited in the camera sensor, so direct methods of measuring the energy are generally not sufficient.

This processing performed on the portable device 100 can be a good preliminary indicator of the presence of high-energy particles using readily available portable devices 100 that can be configured with a visible light obstructer 290 as simple as electrical tape and configured with a small application program for performing the initial processing.

However, additional information and higher confidence of the presence of high-energy particles may be developed from the composite images transmitted to a remote computing device 210 with more computing power. In addition, as mentioned previously, some embodiments may transmit the unprocessed images directly to the remote computing device 210, which may perform the preliminary processing discussed above and may also perform the additional processing discussed below.

Traditional detailed spectroscopy analysis cannot be effectively performed by images obtained by semiconductor image sensors 160 in portable devices 100. For example, X-rays may be severely attenuated or blocked by the lens, and the gamma rays that do reach the camera sensor deposit only a portion of their energy in the semiconductor image sensor 160 since the stopping range greatly exceeds the thickness of the depletion region and the physical pixel size.

Such small and random portions of the energy deposited require different processing to attempt to extract some of the spectrum data. On the remote computing device 210, once the image has been processed to remove noise, additional software may be used to process the composite images to find lines and groups, which may be used to determine exposure.

Figure 6:
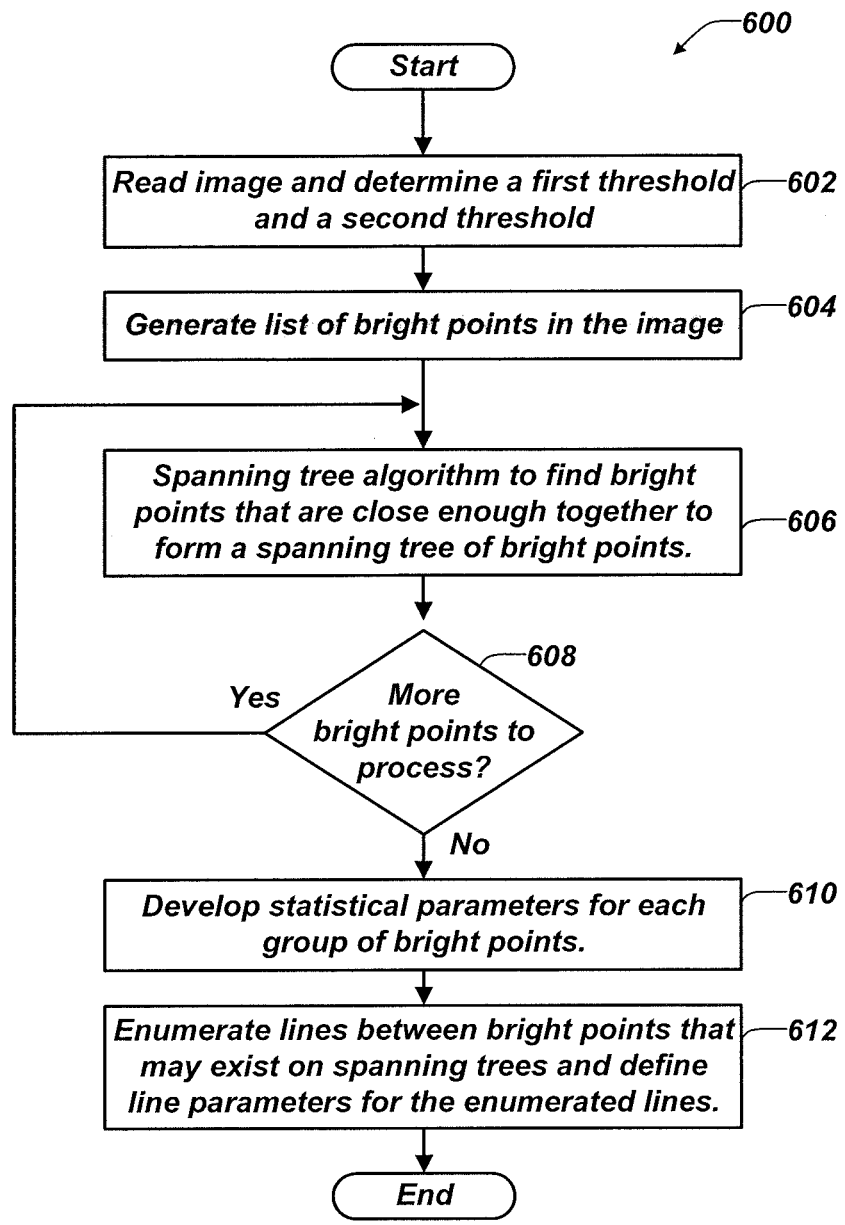
FIG. 6 is a flow diagram showing a process that may be performed on the remote computing device to process composite images.

FIG. 6 is a flow diagram showing a process 600 that may be performed on the remote computing device 210 to further process composite images. Operation 602 indicates that a line finder program reads in the composite image files received from the portable device 100 and, as one non-limiting example, uses the average of the red pixels and blue pixels to be the values used for processing. For raw images, this portion of the processing may be unnecessary. Of course, other embodiments may use different combinations of the color values depending on parameters such as, for example, type of preprocessing that may have been performed on the composite image, type of semiconductor image sensor 160 used, and type of portable device 100 used.

Two values may be used for determining if something is an event or not and the type of event. These values are a bright threshold and a bad bright value. In order for the line finder program to determine that some set of pixels are an event, at least one pixel needs to be over the bright threshold. In order for two bright pixels to be considered part of the same event, a line between them needs to have an average value that is higher than the bad bright value.

The bright threshold (may also be referred to herein as "bright value" and "first threshold") and bad bright value (also referred to herein as "second threshold") can either be specified through command line arguments (or other type of user input), or they can be automatically determined. As a non-limiting example, in one embodiment the automatically determined bright threshold is defined as $\bar{x}+5\sigma+16$ and the automatically determined bad bright value is defined as $\bar{x}+3\sigma+16$, where $\bar{x}$ is the average pixel value and $\sigma$ is the standard deviation.

After determining the bright threshold, operation 604 indicates that the process 600 generates a list of bright points in the image that are above the bright threshold. In one embodiment, the bright points are chosen such that they are at least an exclude size of 2 pixels away from each other. The bright points also may be adjusted within a few pixels to make sure that the brightest local pixel is chosen. Embodiments of the present disclosure can use the resulting lines and bright points to define a statistical distribution of the length of the lines and bright points. This statistical distribution may be used to determine an estimate of the energy from the high-energy particles based, at least in part, on the statistical distribution.

Operation 606 indicates that spanning trees are calculated between the bright points. For each iteration of the spanning tree algorithm, the process starts with a bright point from the bright point list that is currently unattached to a spanning tree. The remaining unattached bright points are iterated over, and the closest bright point is attached to the spanning tree if it is closer than a maximum span length. If the closest bright point to the current spanning tree being processed is greater than the maximum span length, then the current spanning tree is done, and the next spanning tree will be processed. As a non-limiting example, a maximum span length may be about 10 pixels.

Operation 608 indicates that if there are more bright points that are not already part of a spanning tree or have not been processed control returns to operation 606 to look for more spanning trees. Groups are defined as sets of bright pixels that are proximate each other. As a result, a group may include one or more bright points, even if the bright points in the group do not meet the spanning tree criteria. Bright points that are part of any given spanning tree also form a group.

Operation 610 indicates that various statistical parameters may be calculated for each group. As a non-limiting example, these statistics may include the minimum and maximum x and y coordinates bounding the group, the average brightness of the group, the brightest pixel in the group and the sum of the bright points. On a raw image, the sum of the bright points may be directly related to the energy deposited, but on a color image the sum of the bright points may be only approximately related.

Operation block 612 indicates that for each spanning tree, the process may enumerate all the paths from one end to another end to determine if lines should be defined between them. For example, if the spanning tree ended up in a shape similar to the letter Y, there would be three ends and three paths between the three ends. Each of these paths may be evaluated to determine if there is a line between them. For a line to be defined, each pixel between the two bright points needs to have an average value that is higher than the bad bright value. Line parameters may also be defined for each line. As non-limiting examples, these line parameters may be values such as x and y coordinates for a start of the line, x and y coordinates for the end of a line, and total length of the line.

As a non-limiting example, FIG. 4B shows various groups from a close-up view of the image of FIG. 4A. Groups 402, 404, and 406 are groups that include a spanning tree. Groups 408 and 410 are groups that include one or more bright points, but do not include a spanning tree.

While not visible in FIG. 4B due to the grey-scale nature of the drawing, groups 408 and 410 show the bright points that are not attached to a spanning tree as blue pixels. Also not visible in FIG. 4B, groups 402, 404, and 406 show bright points that are part of a spanning tree as red pixels and line segments between the red bright points as green pixels. Group 402 includes two bright points with one line segment between them. Group 404 includes four bright points with three line segments between the four bright points. Group 406 includes five bright points with four line segments between the five bright points.

The ratio of total lines to groups can be correlated with the energy of the high-energy particle. The fraction of groups that have lines can also be correlated to average incoming photon energy. As a result, combined statistics may be developed such as total number of lines and total number of groups found and the number of groups that have lines.

Experiments have been performed with several different curie level sources. The sources tried were a 1.3 Ci Am-241 source, a 1.3 Ci Cs-137 source (1.6 Ci at Jul. 8, 2003), a 0.1 Ci Co-60 source (0.3 Ci at Jul. 8, 2003), a 0.7 Ci Se-75 source (62.0 Ci at Jun. 21, 2010) and a 1.3 Ci Ir-192 source (144.7 Ci at Feb. 23, 2011). The common gamma energies for these various sources are listed in Table 6.

TABLE 6

Most common gamma energies produced by tested nuclides (Voss, 2001)

| Nuclide | Energies (keV) |
| --- | --- |
| Am-241 | 60 (35.9%), 26 (2.4%), 33 (0.1%) |
| Se-75 | 265 (59.8%), 136 (59.2%), 11 (47.5%) 280 (25.2%), 12 (7.3%), 1 (0.9%) |
| Ir-192 | 317 (82.85%), 468 (48.1%), 308 (29.68%), 296 (29.02%), 67 (4.52%), 9 (4.1%), 65 (2.63%), 76 (1.97%) |
| Cs-137 | 662 (89.98%), 32 (5.89%), 36 (1.39%), 5 (1%) |
| Co-60 | 1173 (100%), 1332 (100%) |

The experiments were performed using a portable device 100 with a back camera facing the high-energy particle source 220, but with different distances ranging from 30 cm to 90 cm to the source. For each single count, 100 pictures were taken and then combined with the high-delta method, before being analyzed to determine groups, groups with lines and line fractions as a ratio of groups with lines to total groups.

Figure 7:
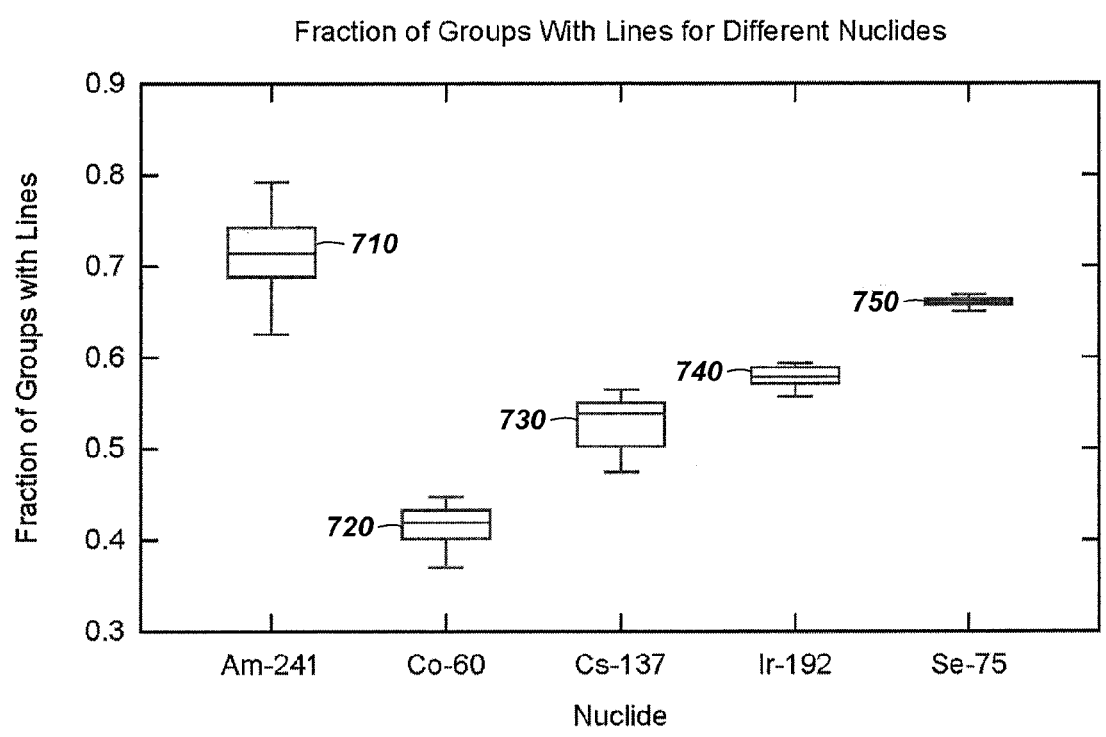
FIG. 7 shows processing results for various nuclides as a fraction of the groups that include lines.

FIG. 7 shows processing results for various nuclides as a fraction of the groups that include lines. Table 7 shows values for the data plotted in FIG. 7.

TABLE 7

Fraction of Groups with Lines Statistics

|  | se-75 | ir-192 | cs-137 | co-60 | am-241 |
| --- | --- | --- | --- | --- | --- |
| Mean | 0.659 | 0.578 | 0.527 | 0.415 | 0.717 |
| Standard Deviation | 0.009 | 0.013 | 0.028 | 0.021 | 0.043 |
| Minimum | 0.642 | 0.557 | 0.474 | 0.370 | 0.625 |
| Maximum | 0.668 | 0.594 | 0.564 | 0.447 | 0.833 |
| Count | 6 | 6 | 39 | 51 | 36 |

As shown in FIG. 7 for each of the nuclides, the upper and lower bars show the maximum and minimum values. The box shows a standard deviation and a line through the box shows a mean. Thus, element 710 shows the statistical values for am-241, element 720 shows the statistical values for co-60, element 730 shows the statistical values for cs-137, element 740 shows the statistical values for ir-192, and element 750 shows the statistical values for se-75.

In general, from FIG. 7 one can see that the fraction of groups with lines decreases as the average energy of the gamma rays. In addition, from the data using the fraction of groups with lines, co-60 and cs-137 can be clearly distinguished from each other and from se-75 and am-241. It can also be seen that ir-192 somewhat overlaps with cs-137, and se-75 somewhat overlaps with am-241.

Changing the angle of the incoming high-energy particles (e.g., gamma rays) changes what materials the gamma rays travel through to get to the semiconductor image sensor 160. These materials can attenuate the gamma rays. The interaction also can generate high-energy electrons that are detected by the semiconductor image sensor 160. As discussed above with reference to FIG. 3, the electrons scattered from Compton scattering have an angular energy dependence. The combination of Compton scattering and material attenuation may change both the number of events that are seen and the types of features that are seen.

For example, a Nexus S phone as the portable device 100 was placed in a 10 R/hr field generated from Cs-137 and a separate 10 R/hr field generated from Co-60. In one configuration the portable device 100 was positioned vertically with the back camera facing the high-energy particle source 220. In another configuration, the portable device 100 was positioned vertically, but with the back camera against a 30.5×30.5×15.2 cm (12×12×6 inch) block of LUCITE® (Polymethyl methacrylate) such that the LUCITE® block was between the portable device 100 and the high-energy particle source 220.

In this experiment, 40 pictures were taken with both the front camera and the back camera. A background picture was then generated using the highest value found that was less than the pixel components' $\bar{x}+2\sigma$ value using the standard deviation method discussed above with reference to Equation 2. The background picture was then subtracted from each of the 40 pictures to create the composite image as the result from process 500 in FIG. 5. Line finding and group counting was then performed as discussed with respect to process 600 in FIG. 6.

Tables 8 and 9 provide the summary data for the back camera and the front camera, respectively and with or without the LUCITE® block. The lines of the table show the results with the configuration at various angles relative to the source (where 0 degrees is the back camera facing the source). The columns shown include; the total number of groups, the number of groups with lines greater than 2 pixels long (GwL), the number of groups with lines greater than 10 pixels long (GwLL), and the maximum line length found in all the groups (MLL).

TABLE 8

Nexus S Rotation From Back Camera

| | | Back Camera with LUCITE ® | | | | Back Camera without LUCITE ® | | | |
|---|---|---|---|---|---|---|---|---|---|
| Nuclide | Degrees | Groups | GwL | GwLL | MLL | Groups | GwL | GwLL | MLL |
| cs-137 | 0 | 33699 | 15422 | 3415 | 69.69 | 78143 | 32324 | 7676 | 79.40 |
| cs-137 | 90 | 57803 | 28188 | 7041 | 99.27 | 52068 | 25246 | 6335 | 86.24 |
| cs-137 | 180 | 78089 | 33335 | 7789 | 75.51 | 72336 | 29394 | 7070 | 99.62 |
| cs-137 | 270 | 58905 | 28665 | 7044 | 97.13 | 58223 | 28111 | 7081 | 80.72 |
| co-60 | 0 | 52591 | 18649 | 4004 | 70.88 | 99868 | 32826 | 7383 | 115.07 |
| co-60 | 90 | 75730 | 30407 | 7298 | 83.80 | 73267 | 29285 | 7064 | 128.98 |
| co-60 | 180 | 91483 | 31471 | 7155 | 89.08 | 88264 | 29075 | 6494 | 102.07 |
| co-60 | 270 | 79504 | 31720 | 7598 | 100.65 | 75897 | 29807 | 7117 | 106.89 |

TABLE 9

Nexus S Rotation Data From Front Camera

| | | Front Camera with LUCITE ® | | | | Front Camera without LUCITE ® | | | |
|---|---|---|---|---|---|---|---|---|---|
| Nuclide | Degrees | Groups | GwL | GwLL | MLL | Groups | GwL | GwLL | MLL |
| cs-137 | 0 | 254 | 92 | 6 | 21.67 | 515 | 165 | 7 | 22.61 |
| cs-137 | 90 | 445 | 150 | 16 | 20.54 | 433 | 126 | 9 | 19.30 |
| cs-137 | 180 | 609 | 184 | 17 | 17.06 | 534 | 165 | 18 | 18.06 |
| cs-137 | 270 | 435 | 127 | 12 | 17.46 | 356 | 111 | 8 | 25.21 |
| co-60 | 0 | 245 | 78 | 3 | 15.39 | 458 | 118 | 13 | 25.32 |
| co-60 | 90 | 437 | 117 | 8 | 19.34 | 395 | 95 | 4 | 15.86 |
| co-60 | 180 | 497 | 130 | 10 | 21.11 | 454 | 109 | 8 | 16.39 |
| co-60 | 270 | 447 | 133 | 10 | 14.57 | 368 | 98 | 6 | 14.53 |

Figure 8:
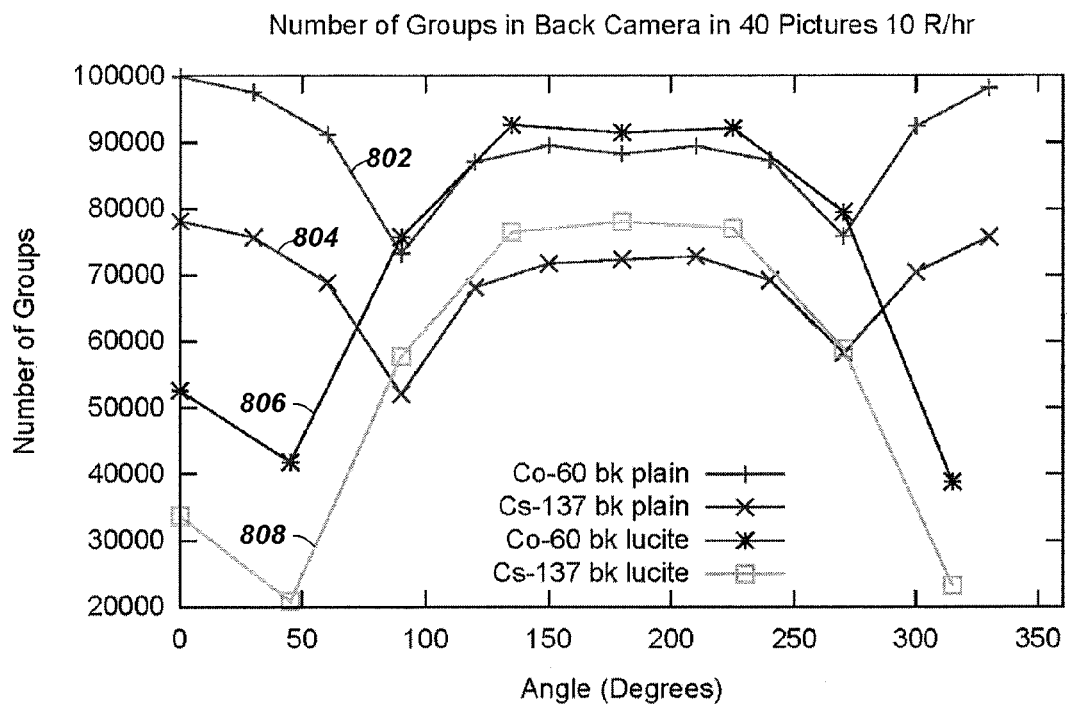
FIG. 8 shows the number of groups for exposures to a back camera of the portable device at various angles of exposures for two different sources each with a LUCITE® block and without a LUCITE® block.

FIG. 8 shows the number of groups for exposures to a back camera of the portable device 100 at various angles of exposures for the two different sources each with a LUCITE® block and without a LUCITE® block. Line 802 shows the number of groups for co-60 as the source and without the LUCITE® block. Line 804 shows the number of groups for cs-137 as the source and without the LUCITE® block. Line 806 shows the number of groups for co-60 as the source and with the LUCITE® block. Line 808 shows the number of groups for cs-137 as the source and with the LUCITE® block.

Figure 9:
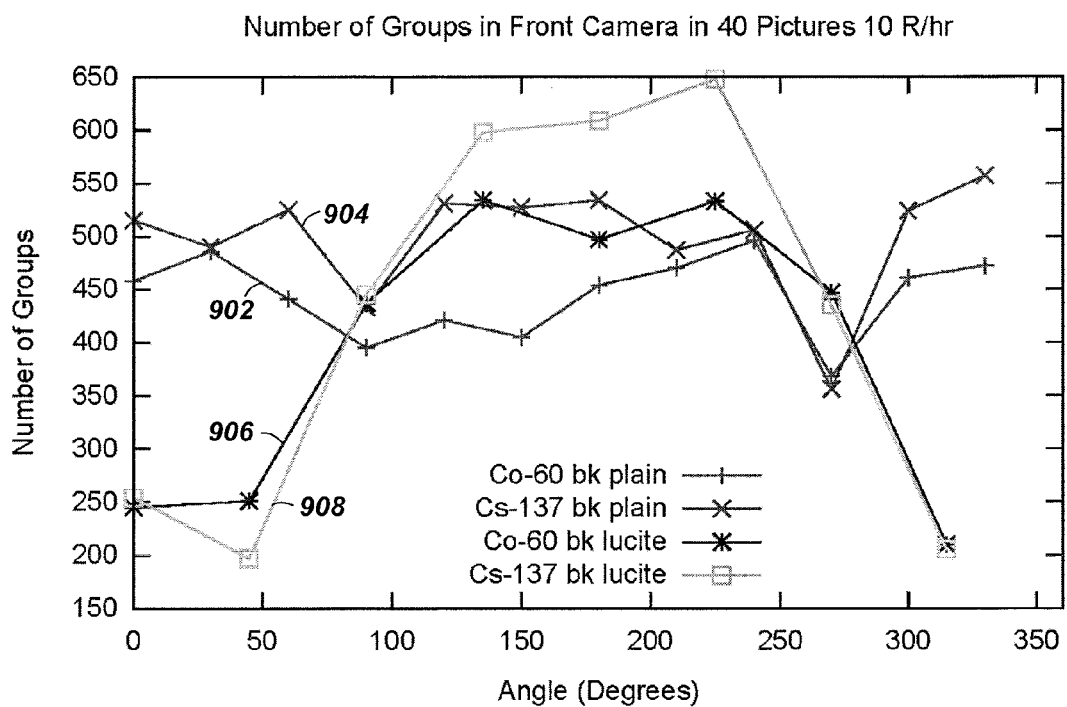
FIG. 9 shows the number of groups for exposures to a front camera of the portable device at various angles of exposures for two different sources each with a LUCITE® block and without a LUCITE® block.

FIG. 9 shows the number of groups for exposures to a front camera of the portable device 100 at various angles of exposures for the two different sources each with a LUCITE® block and without a LUCITE® block. Line 902 shows the number of groups for co-60 as the source and without the LUCITE® block. Line 904 shows the number of groups for cs-137 as the source and without the LUCITE® block. Line 906 shows the number of groups for co-60 as the source and with the LUCITE® block. Line 908 shows the number of groups for cs-137 as the source and with the LUCITE® block.

From the data in Tables 8 and 9 and graphs of FIGS. 8 and 9 it can be seen that the LUCITE® block attenuates the source strength resulting in lower numbers of groups compared to plain air near 0 degrees, but increases the group count from scattering when the cell phone camera is between or beside the LUCITE® block. The LUCITE® block testing was done to emulate the effect of carrying the portable device 100 next to a human since the LUCITE® is made of hydrogen, carbon and oxygen. Depending on whether the human is between the portable device 100 and the source, or the portable device 100 is between the human and the source, the measured dose rate will either be decreased or increased. For the in plain air data, the dose differences when rotated may be caused by different attenuation and scattering from the internal components of the portable device 100.

Figure 10:
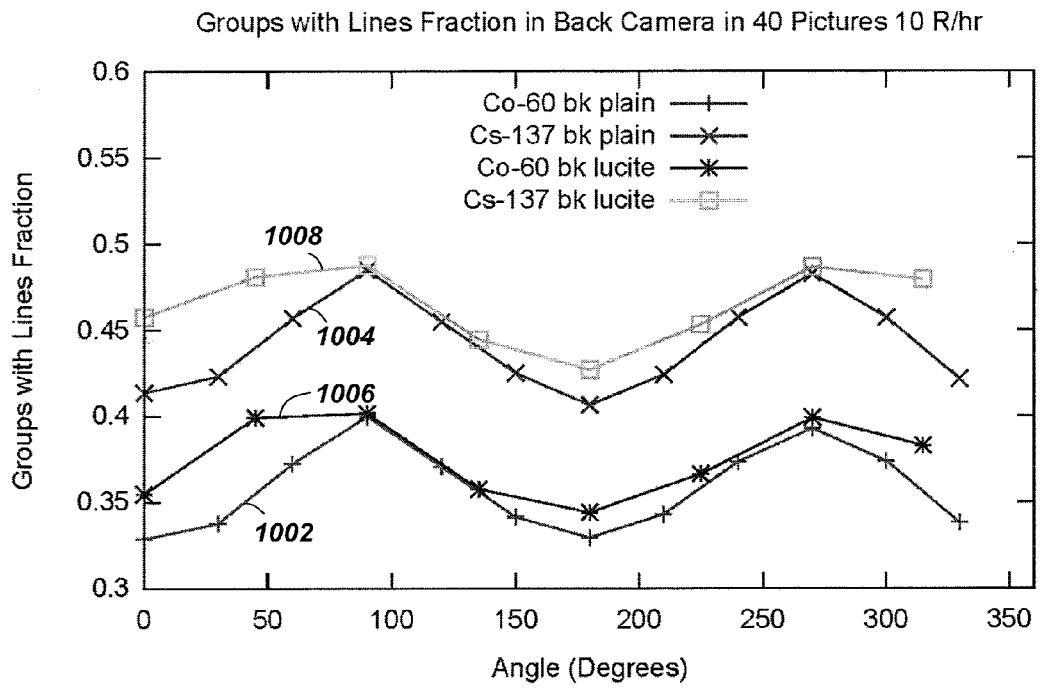
FIG. 10 shows the fraction of groups with lines for exposures to a back camera of the portable device at various angles of exposures for two different sources each with a LUCITE® block and without a LUCITE® block.

FIG. 10 shows the fraction of groups with lines (second column for each configuration in table 8) for exposures to the back camera of the portable device 100 at various angles of exposures for two different sources each with a LUCITE® block and without a LUCITE® block. Line 1002 shows the fraction of groups with lines for co-60 as the source and without the LUCITE® block. Line 1004 shows the fraction of groups with lines for cs-137 as the source and without the LUCITE® block. Line 1006 shows the fraction of groups with lines for co-60 as the source and with the LUCITE® block. Line 1008 shows the fraction of groups with lines for cs-137 as the source and with the LUCITE® block.

Figure 11:
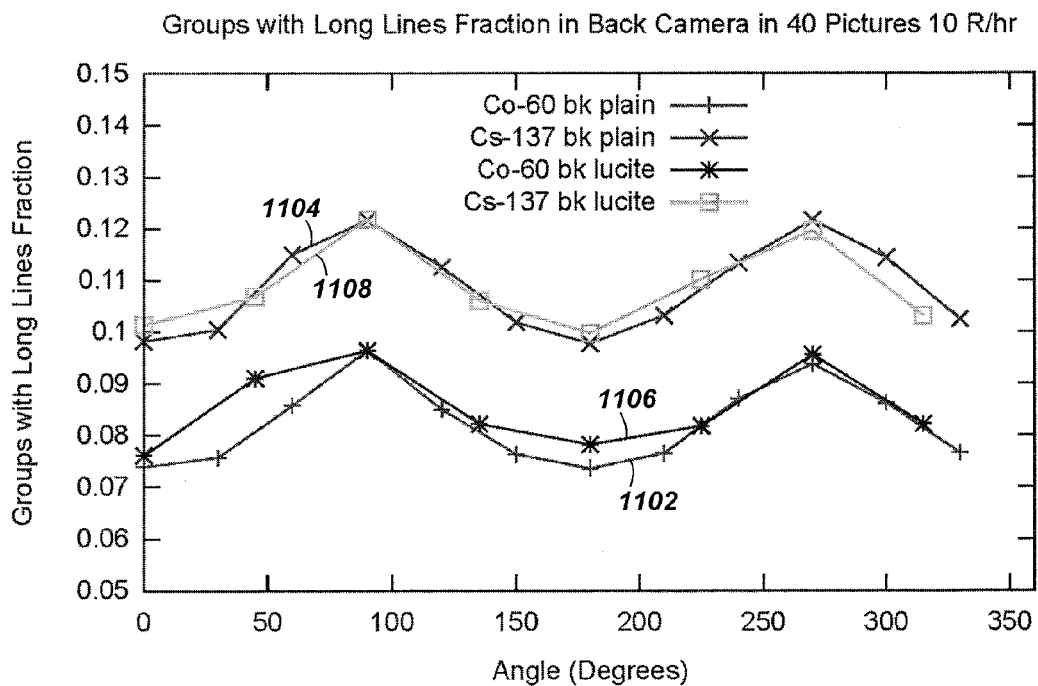
FIG. 11 shows the fraction of groups with long lines for exposures to a back camera of the portable device at various angles of exposures for two different sources each with a LUCITE® block and without a LUCITE® block.

FIG. 11 shows the fraction of groups with long lines (third column for each configuration in table 8) for exposures to the back camera of the portable device 100 at various angles of exposures for two different sources each with a LUCITE® block and without a LUCITE® block. Line 1102 shows the fraction of groups with long lines for co-60 as the source and without the LUCITE® block. Line 1104 shows the fraction of groups with long lines for cs-137 as the source and without the LUCITE® block. Line 1106 shows the fraction of groups with long lines for co-60 as the source and with the LUCITE® block. Line 1108 shows the fraction of groups with long lines for cs-137 as the source and with the LUCITE® block.

Examining the fraction of groups with lines (FIG. 10) and the fraction of groups with long lines (FIG. 11) leads to some conclusions. One detail to note is the fractions vary with the incoming angle of the high-energy particles. Because the data samples nearly overlap between the Co-60 and the Cs-137, if the incoming gamma angle is not known and cannot be determined, it may not be possible to distinguish the nuclides, unlike in the case with a known incoming gamma angle discussed above with reference to FIG. 7. However, because the portable device 100 does have orientation sensors, it is at least conceivable that this difference might be able to be used to determine the direction to the gamma source. This determination might require accurate position registration when the picture was taken, and substantial amounts of data transfer between the portable device 100 and the remote computing device 210.

Figure 12:
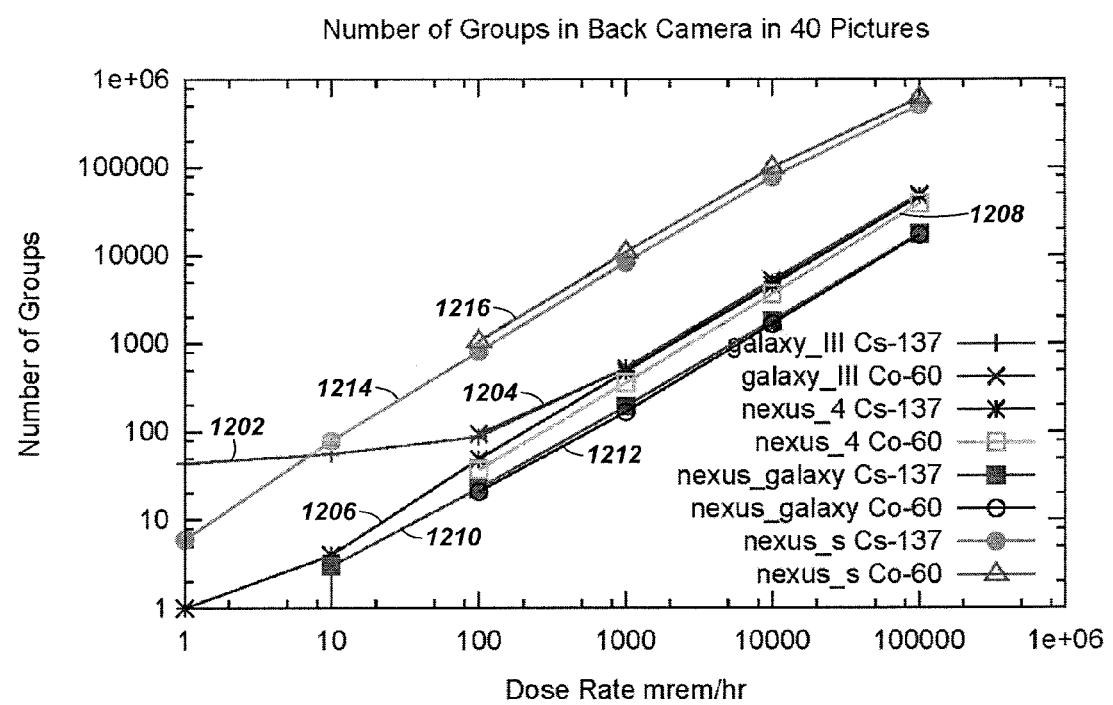
FIG. 12 shows the number of groups for exposures to two different sources using four different portable devices across a spectrum of exposure rates.

FIG. 12 shows the number of groups for exposures to two different sources using four different portable devices 100 across a spectrum of exposure rates from 1 mrem/hr to 100,000 mrem/hr. Lines 1202 and 1204 show the number of groups across the exposure spectrum for a Samsung Galaxy SIII portable device 100 exposed to cs-137 and co-60, respectively. Lines 1206 and 1208 show the number of groups across the exposure spectrum for an LG Nexus 4 portable device 100 exposed to cs-137 and co-60, respectively. Lines 1210 and 1212 show the number of groups across the exposure spectrum for a Samsung Galaxy Nexus portable device 100 exposed to cs-137 and co-60, respectively. Lines 1214 and 1216 show the number of groups across the exposure spectrum for a Samsung Nexus S portable device 100 exposed to cs-137 and co-60, respectively. FIG. 12 illustrates a clear correspondence between the number of groups and the dose rate for all devices and both sources.

While the invention is susceptible to various modifications and implementation in alternative forms, specific embodiments have been shown by way of examples in the drawings and have been described in detail herein. However, it should be understood that the invention is not intended to be limited to the particular forms disclosed. Rather, the invention includes all modifications, equivalents, and alternatives falling within the scope of the following appended claims and their legal equivalents.

What is claimed is:

1. A portable device with an image capturing capability, comprising:
    a semiconductor image sensor comprising a plurality of pixels;
    a visible light obstructer for blocking visible light from impinging on the semiconductor image sensor when in place; and
    processing circuitry configured for:
        causing the semiconductor image sensor to be exposed to high-energy photons during a period of interest and while the visible light obstructer is in place;
        repeatedly sampling the semiconductor image sensor during the period of interest to generate a plurality of images;
        determining a common noise in the plurality of images, wherein the common noise is determined from noise in two or more images of the plurality of images;
        generating a composite image comprising a combination of the two or more images of the plurality of images with the common noise removed so the composite image includes image information corresponding to one or more radiated pixels of the plurality of pixels that absorbed at least some energy from one or more of the high-energy photons;
        processing the composite image to determine pixel groups, each pixel group comprising two or more adjacent radiated pixels;
        for each pixel group, identifying lines of radiated pixels between two radiated pixels in that pixel group;
        determining a line ratio as a number of pixel groups with one or more lines relative to a total number of pixel groups; and
        determining a type of nuclide that generated the high-energy photons responsive to the line ratio.

2. The portable device of claim 1, wherein the semiconductor image sensor comprises a Complementary Metal Oxide Semiconductor (CMOS) type image sensor.

3. The portable device of claim 1, wherein the semiconductor image sensor comprises a Charge Coupled Device (CCD) type image sensor.

4. The portable device of claim 1, wherein the processing circuitry is further configured for determining the common noise and generating the composite image by performing a high-delta process comprising:
    developing a highest value array and a second highest value array for each color of each pixel of a first image of the plurality of images;
    updating the highest value array and the second highest value array for each color of each pixel of each subsequent image of the plurality of images;
    defining a signal as a difference between the highest value array and the second highest value array; and
    determining a dose rate for the plurality of images responsive to a number of pixels containing the signal that is over a signal threshold value.

5. The portable device of claim 1, further comprising a communication element operably coupled with the processing circuitry and configured for communicating the composite image from the portable device to a remote computing device.

6. A method of detecting high-energy photons, comprising:
    exposing a semiconductor image sensor to high-energy photons during a period of interest and while a visible light obstructer is in place to block visible light from impinging on the semiconductor image sensor;
    repeatedly sampling the semiconductor image sensor during the period of interest to generate a plurality of images;
    determining a common noise in the plurality of images, wherein the common noise is determined from noise in two or more images of the plurality of images;
    generating a composite image comprising a combination of the two or more images of the plurality of images with the common noise removed so the composite image includes image information corresponding to one or more radiated pixels of a plurality of pixels that absorbed at least some energy from one or more of the high-energy photons;
    processing the composite image to determine pixel groups, each pixel group comprising two or more adjacent radiated pixels;
    for each pixel group, identifying lines of radiated pixels between two radiated pixels in that pixel group;
    determining a line ratio as a number of pixel groups with one or more lines relative to a total number of pixel groups; and
    determining an average energy of the high-energy photons responsive to the line ratio.

7. The method of claim 6, wherein repeatedly exposing the semiconductor image sensor comprises exposing a sensor selected from the group consisting of a Complementary Metal Oxide Semiconductor (CMOS) type image sensor and a Charge Coupled Device (CCD) type image sensor.

8. The method of claim 6, wherein determining the common noise and generating the composite image include performing a high-delta process comprising:
    developing a highest value array and a second highest value array for each color of each pixel of a first image of the plurality of images;
    updating the highest value array and the second highest value array for each color of each pixel of each subsequent image of the plurality of images;
    defining a signal as a difference between the highest value array and the second highest value array; and
    determining a dose rate for the plurality of images responsive to a number of pixels containing the signal that is over a signal threshold value.

9. The method of claim 6, further comprising determining a type of nuclide that generated the high-energy photons responsive to the line ratio.

10. A computing system, comprising:
    memory for holding computing instructions; and
    at least one processor operably coupled to the memory and configured to execute the computing instructions to cause the computing system to perform the acts of:
        processing an image from a semiconductor image sensor exposed to high-energy particles while not exposed to visible light to determine pixel groups as a set of adjacent bright points in the image, each bright point comprising a pixel with a value above a first threshold, the first threshold comprising a value that is greater than an average of all pixels in the image;
        processing each pixel group to identify lines of radiated pixels between two bright points in that pixel group, each line comprising two or more bright points of the set of bright points and intermediary pixels positioned between the two or more bright points, wherein the intermediary pixels have a value that is above a second threshold and less than the first threshold, the second threshold comprising a value that is greater than the average of all pixels in the image and less than the first threshold;
        determining a fraction of pixel groups that includes one or more lines relative to pixel groups without lines; and
        identifying a type of nuclide that generated the high-energy particles responsive to the fraction of pixel groups that include one or more lines.

11. The computing system of claim 10, wherein the computing instructions further cause the computing system to perform the act of determining an estimate of the energy from the high-energy particles responsive to a statistical distribution of line lengths for the lines and bright points.

12. The computing system of claim 10, wherein the computing instructions further cause the computing system to perform the act of identifying the presence of the high-energy particles responsive to the number of identified lines by:
    identifying line groups comprising bright points that belong to a line;
    identifying non-line groups comprising bright points that do not belong to a line; and
    identifying the presence of the high-energy particles responsive to a number of the line groups relative to a number of the non-line groups.

13. A method of detecting high-energy particles, comprising:
    processing an image from a semiconductor image sensor exposed to high-energy particles while not exposed to visible light to determine a set of bright points in the image, each bright point comprising a pixel with a value above a first threshold, the first threshold comprising a value that is greater than an average of all pixels in the image;
    processing the image to determine pixel groups, each pixel group comprising two or more adjacent bright points of the set of bright points;
    processing the image to determine lines, each line comprising two or more bright points of the set of bright points and intermediary pixels positioned between the two or more bright points, wherein the intermediary pixels have a value that is above a second threshold and less than the first threshold, the second threshold comprising a value that is greater than the average of all pixels in the image and less than the first threshold; and
    identifying a type of nuclide that generated the high-energy particles responsive to a number of pixel groups that include one or more lines relative to a total number of pixel groups.

14. The method of claim 13, further comprising determining an estimate of the energy from the high-energy particles responsive to a statistical distribution of line lengths for the lines and bright points.

15. The method of claim 13, wherein identifying the presence of the high-energy particles responsive to the number of identified lines further comprises:
    identifying line groups comprising bright points that belong to a line;
    identifying non-line groups comprising bright points that do not belong to a line; and
    identifying the presence of the high-energy particles responsive to a number of the line groups relative to a number of the non-line groups.

16. A computing system including an image capturing capability, comprising:
    a portable device comprising:
        a semiconductor image sensor comprising a plurality of pixels; and
        a visible light obstructer for blocking visible light from impinging on the semiconductor image sensor when in place; and
    processing circuitry configured for:
        causing the semiconductor image sensor to be exposed to high-energy particles during a period of interest and while the visible light obstructer is in place;
        repeatedly sampling the semiconductor image sensor during the period of interest to generate a plurality of images;
        generating a composite image comprising a combination of two or more images of the plurality of images with a common noise determined from noise in the two or more images of the plurality of images removed so the composite image includes image information corresponding to one or more radiated pixels of the plurality of pixels that absorbed at least some energy from one or more of the high-energy particles;
        processing the composite image to determine a set of bright points in the composite image, each bright point comprising a pixel with a value above a first threshold, the first threshold comprising a value that is greater than an average of all pixels in the composite image;
processing the composite image to determine pixel groups, each pixel group comprising two or more adjacent bright points of the set of bright points;
processing the composite image to determine lines, each line comprising two or more bright points of the set of bright points and intermediary pixels positioned between the two or more bright points, wherein the intermediary pixels have a value that is above a second threshold and less than the first threshold, the second threshold comprising a value that is greater than the average of all pixels in the composite image and less than the first threshold;
determining a line ratio as a number of pixel groups including lines relative to a total number of pixel groups; and
identifying a type of nuclide that generated the high-energy particles responsive to the line ratio.

17. The computing system of claim 16, wherein the computing instructions further cause the computing system to perform the act of determining an estimate of an average energy of the high-energy particles responsive to the line ratio.

18. The computing system of claim 16, wherein the processing circuitry is further configured for identifying the presence of the high-energy particles responsive to the number of identified lines by:
identifying line groups comprising bright points that belong to a line;
identifying non-line groups comprising bright points that do not belong to a line; and
identifying the presence of the high-energy particles responsive to a number of the line groups relative to a number of the non-line groups.

19. The computing system of claim 16, wherein the processing circuitry is further configured for generating the composite image by performing a high-delta process comprising:
developing a highest value array and a second highest value array for each color of each pixel of a first image of the plurality of images;
updating the highest value array and the second highest value array for each color of each pixel of each subsequent image of the plurality of images;
defining a signal as a difference between the highest value array and the second highest value array; and
determining a dose rate for the plurality of images responsive to a number of pixels containing the signal that is over a signal threshold value.

20. The computing system of claim 16, wherein the processing circuitry includes at least one portable device processor on the portable device and the at least one portable device processor is configured for executing computing instructions to perform the acts of the processing circuitry.

21. The computing system of claim 16, wherein the processing circuitry includes at least one portable device processor on the portable device and at least one remote processor on a remote computing device and wherein:
the at least one portable device processor is configured for executing computing instructions to perform the acts of repeatedly causing the semiconductor image sensor to be exposed to the high-energy particles and generating the composite image; and
the at least one remote processor is configured for executing computing instructions to perform the acts of processing the composite image, processing the set of bright spots, and identifying the presence of the high-energy particles.

22. A method of detecting high-energy particles, comprising:
exposing a semiconductor image sensor to high-energy particles during a period of interest while a visible light obstructer is in place to block visible light from impinging on the semiconductor image sensor;
repeatedly sampling the semiconductor image sensor during the period of interest to generate a plurality of images;
generating a composite image comprising a combination of two or more images of the plurality of images with a common noise determined from noise in the two or more images of the plurality of images removed so the composite image includes image information corresponding to one or more radiated pixels of a plurality of pixels that absorbed at least some energy from one or more of the high-energy particles;
processing the composite image to determine a set of bright points in the composite image, each bright point comprising a pixel with a value above a first threshold, the first threshold comprising a value that is greater than an average of all pixels in the composite image;
processing the composite image to determine pixel groups, each pixel group comprising two or more adjacent bright points of the set of bright points;
processing the composite image to determine lines, each line comprising two or more bright points of the set of bright points and intermediary pixels positioned between the two or more bright points, wherein the intermediary pixels have a value that is above a second threshold and less than the first threshold, the second threshold comprising a value that is greater than the average of all pixels in the composite image and less than the first threshold; and
identifying a type of nuclide that generated the high-energy particles responsive to a number of pixel groups including lines relative to a total number of pixel groups.

23. The method of claim 22, further comprising determining an estimate of the energy from the high-energy particles responsive to a statistical distribution of line lengths for the lines and bright points.

24. The method of claim 22, wherein identifying the presence of the high-energy particles responsive to the number of identified lines further comprises:
identifying line groups comprising bright points that belong to a line;
identifying non-line groups comprising bright points that do not belong to a line; and
identifying the presence of the high-energy particles responsive to a number of the line groups relative to a number of the non-line groups.

25. The method of claim 22, wherein generating the composite image further comprises performing a high-delta process comprising:
developing a highest value array and a second highest value array for each color of each pixel of a first image of the plurality of images;
updating the highest value array and the second highest value array for each color of each pixel of each subsequent image of the plurality of images;
defining a signal as a difference between the highest value array and the second highest value array; and determining a dose rate for the plurality of images responsive to a number of pixels containing the signal that is over a signal threshold value.

26. The method of claim 22, wherein the acts are performed on processing circuitry on a portable device.

27. The method of claim 22, wherein:
the acts of repeatedly causing the semiconductor image sensor to be exposed to the high-energy particles and generating the composite image are performed by processing circuitry on a portable device; and
the acts of processing the composite image, processing the set of bright spots, and identifying the presence of the high-energy particles are performed by processing circuitry on a remote computing device receiving the composite image from the portable device.

* * * * *

UNITED STATES PATENT AND TRADEMARK OFFICE
CERTIFICATE OF CORRECTION

PATENT NO. : 9,939,534 B2
APPLICATION NO. : 14/080542
DATED : April 10, 2018
INVENTOR(S) : Joshua Joseph Cogliati It is certified that error appears in the above-identified patent and that said Letters Patent is hereby corrected as shown below:

In the Specification
Column 10, Line 54, change "off One method" to --off. One method--

Signed and Sealed this
Twelfth Day of June, 2018

Andrei Iancu
*Director of the United States Patent and Trademark Office*